Oct. 10, 1967 T. F. HAGGAI 3,346,815

FM DEMODULATOR SYSTEM WITH IMPROVED SENSITIVITY

Filed May 21, 1964 5 Sheets-Sheet 1

INVENTOR.
THEODORE F. HAGGAI,
BY
Walter J. Adam
ATTORNEY.

Oct. 10, 1967 T. F. HAGGAI 3,346,815

FM DEMODULATOR SYSTEM WITH IMPROVED SENSITIVITY

Filed May 21, 1964 5 Sheets-Sheet 2

Oct. 10, 1967 T. F. HAGGAI 3,346,815

FM DEMODULATOR SYSTEM WITH IMPROVED SENSITIVITY

Filed May 21, 1964 5 Sheets-Sheet 4

United States Patent Office 3,346,815

Patented Oct. 10, 1967

3,346,815
FM DEMODULATOR SYSTEM WITH IMPROVED SENSITIVITY

Theodore F. Haggai, Costa Mesa, Calif., assignor to Hughes Aircraft Company, Culver City, Calif., a corporation of Delaware Filed May 21, 1964, Ser. No. 369,071
7 Claims. (Cl. 329—122)

This invention relates to frequency demodulators and particularly to an FM demodulator system that provides a high degree of sensitivity.

Conventional phase lock FM (frequency modulation) demodulators require a threshold power determined by the closed-loop noise bandwidth, that is, the response bandwidth presented to input thermal noise. The phase lock loop is conventionally optimized by selecting a noise bandwidth which minimizes total MS (mean square) phase error at threshold. Phase error due to noise is directly proportional to the noise bandwidth, while phase error due to modulation of the carrier is inversely proportional to the fourth power of the noise bandwidth. The noise bandwidth and the loop bandwidth, which may be the bandwidth at which the gain is down 3 decibels, are conventionally selected to be relatively narrow in order to minimize the total noise bandwidth and to optimize the system for minimum total MS phase error. As the noise bandwidth is a function of the modulation index and of the closed loop natural undamped resonant frequency of the loop, the modulation index and the natural resonant frequency are conventionally limited in value to prevent threshold degradation. Once optimized, for a given modulation index, the conventional FM demodulator cannot accommodate an increase in modulation index without suffering degradation in threshold sensitivity. Another problem with conventional FM demodulators when utilized to provide a variable or selectable bandwidth such as in receivers subject to received interference noise, is that the loop bandwidth must be varied by switching the loop response at the loop filter. This switching operation results in transients which may cause the loop to temporarily or permanently change to an out of phase lock condition.

It is therefore an object of this invention to provide an FM demodulator system that has a relatively high threshold sensitivity.

It is a further object of this invention to provide an FM demodulator system that maintains a linear relationship between output signal and input carrier signal for a relatively low carrier power.

It is a still further object of this invention to provide an FM demodulator system that provides a relatively high output test tone to intermodulation noise ratio at a relatively large modulation index.

It is another object of this invention to provide a phase locked FM demodulator that has a relatively narrow response bandwidth to input noise power but has a relatively wide loop bandwidth so as to minimize phase error due to modulation.

It is still another object of this invention to provide an FM demodulator system that will demodulate selectable bands of signals without varying the element characteristics of the phase lock loop.

It has been determined in accordance with the principles of the invention, that over a range of modulation indexes of practical interest, the noise bandwidth resulting from a conventional phase lock loop is greater than the IF (intermediate frequency) bandwidth required to pass the signal to be demodulated. The FM demodulator system in accordance with the invention includes an IF filter of relatively small bandwidth or of minimum allowable bandwidth preceding the demodulator external to the phase lock loop. The loop gain, the noise bandwidth of the loop itself (apart from the noise passed through the IF filter) and the undamped natural resonant frequency are selected to be much larger than the IF bandwidth, which limits noise power applied to the loop and thus prevents signal degradations therefrom. The high loop gain provided by the large loop bandwidth results in a relatively small phase error due to input signal modulation, that is, the error voltage required to make the voltage controlled oscillator track input carrier deviation is relatively small compared to the error voltage which is caused by input thermal noise. Thus, one component of phase error which normally degrades threshold sensitivity is substantially eliminated. The threshold extension provided by the demodulator of the invention may be exchanged for improved output test tone to noise ratio when the received power is sufficient to operate the demodulator above threshold, by increasing the modulation index to a selected relatively large value. The bandwidth of the IF filter may be varied without changing the loop parameters.

The novel features of the invention, as well as the invention itself, both as to its organization and method of operation, will best be understood from the accompanying description, taken in connection with the accompanying drawings, in which like reference characters refer to like parts, and in which.

Figure 1:
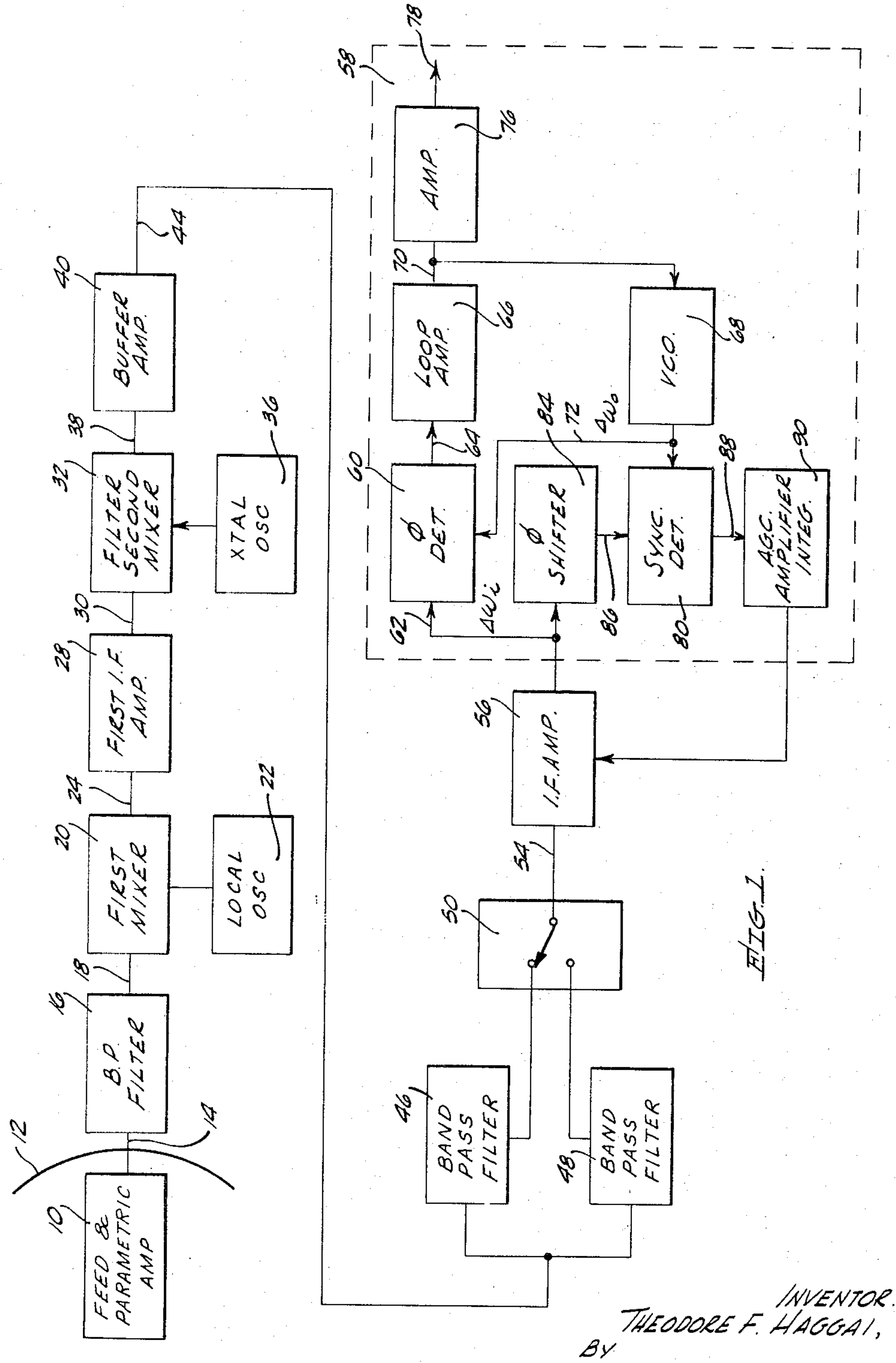
FIG. 1 is a schematic circuit and block diagram of the improved FM demodulator system in accordance with the invention.
Figure 7:
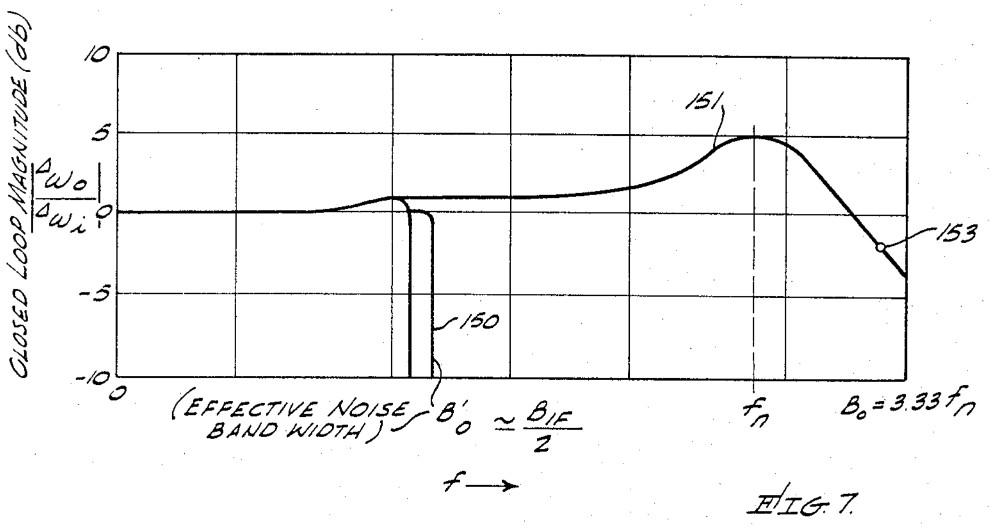
Figure 6:
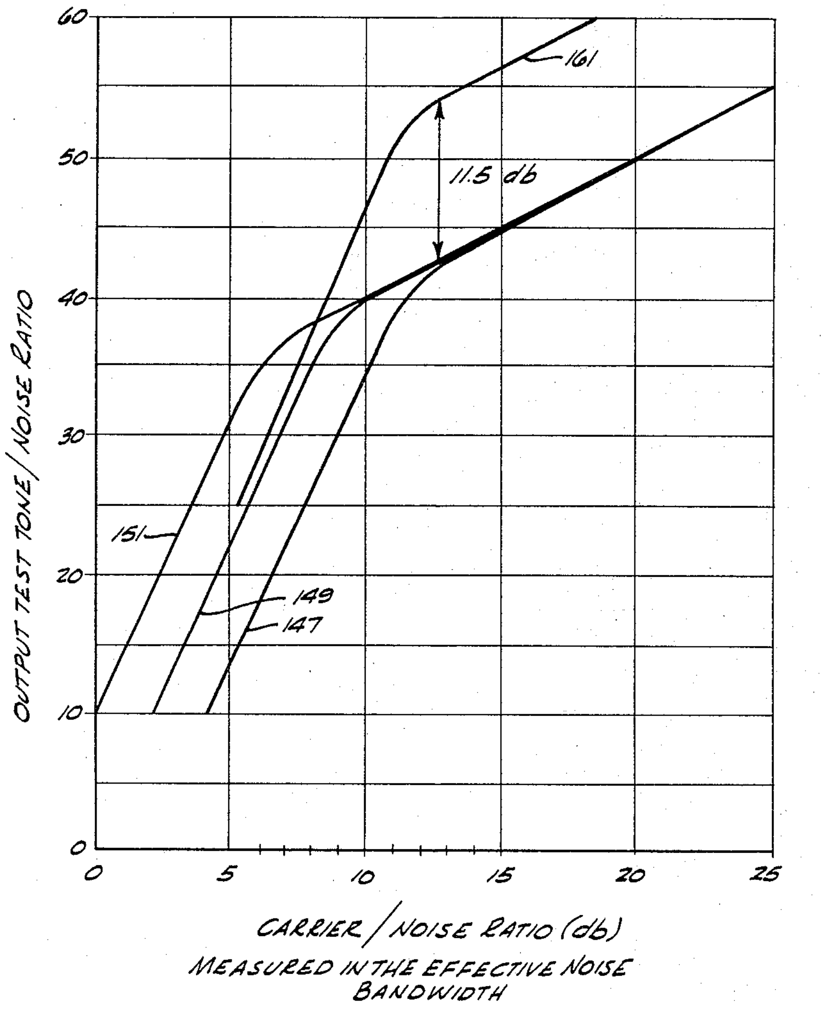

FIG. 6 is a graph of the output test tone-to-noise ratio as a function of the carrier-to-noise ratio at a specific index of modulation for explaining the increased sensitivity and the increased output test tone-to-noise ratio of the demodulator system of FIG. 1; and FIG. 7 is a graph of the ratio of output signal to input signal radian frequency deviations normalized by the undamped resonant frequency for explaining the closed loop response and the effect of IF bandwidth limiting the FM demodulator system of FIG. 1.

Referring now to FIG. 1, the FM (frequency modulation) detector system in accordance with the invention may operate in an FM receiver which includes a feed and parametric amplifier 10 responding to FM carrier signals intercepted by a parabolic antenna dish 12, for example. The feed and parametric amplifier 10 may be conventional arrangements interconnected by a coaxial cable, for example, as is well known in the art. Also, in accordance with the principles of the invention, other sources of FM informational signals may be utilized as are well known in the art. The carrier signals may be applied from the parametric amplifier through a lead 14 to a pass band filter 16 at an intercepted frequency, and after wide band filtering, applied through a lead 18 to a first IF (intermediate frequency) mixer 20. A local oscillator 22 applies reference signals to the first mixer 20 which in turn applies a heterodyned signal to a lead 24 at a first IF frequency. A first IF amplifier 28 responds to the signal on the lead 24 to apply an amplified signal through a lead 30 to a filter and second IF mixer 32. A voltage controlled crystal oscillator 36 may be coupled to the mixer 32 to apply an IF signal to a lead 38 at a second IF frequency. The voltage controlled oscillator 36 may either operate at a fixed reference frequency or may be controlled by signals from other sources (not shown). The IF signal on the lead 38 is then applied through a buffer amplifier 40 to a lead 44 and to filters 46 and 48. A switch 50 energizes either the filter 46 or 48 for providing a respective band pass of 10 kc. (kilocycles) or 2 kc., both pass bands centered on the IF frequency, the narrower pass band being provided for operations during conditions of extreme atmospheric noise or heavy rainfall attenuation, for example. The IF signal after narrow band filtering is applied through the switch 50 to a lead 54 and through an IF amplifier 56 which may have its gain controlled to apply the carrier signal at a constant amplitude level to a phase lock FM demodulator 58. Gain controlled amplifiers are well known in the art.

A phase detector 60 of the demodulator 58 responds to the carrier signal applied from the IF amplifier 56 to a lead 62 and to a signal on a lead 72 to develop a demodulated voltage which is applied through a lead 64 to a loop amplifier 66. A voltage controlled oscillator 68 responds to a signal applied by the loop amplifier 66 to a lead 70 to develop an oscillating signal which is applied through the lead 72 to the phase detector 60. The signal on the lead 70 may be applied through a base band amplifier 76 to a lead 78 for being utilized in an audio system such as a telephone or conventional speaker, for example.

For controlling the gain of the IF amplifier 56, a synchronous detector 80 responds to the signal on the lead 72 and a signal on the lead 62 after a phase shift from its quadrature relationship. A phase shifter 84 responds to the carrier signal on the lead 62 to apply the signal to the lead 86 after a 90 degree phase shift. An AGC voltage developed by the synchronous detector 80 is applied through a lead 88 to an AGC amplifier and integrator circuit 90 and through a lead 92 to control the gain of the IF amplifier 56.

The phase detector 60 and the synchronous detector 80 may be any conventional circuits such as shown on page 553 of the book, "Electronic Methods," volume 2, by E. Bleuler and R. O. Haxby, published by The Academic Press in New York. The phase shifter 84 may be any conventional arrangement such as shown on page 551 of the above mentioned "Electronic Methods" book. The loop amplifier 66 may include a conventional RC filter having a first resistor coupled in the signal path and a second resistor coupled from a point in the signal path beyond the first resistor to a capacitor which in turn may be coupled to a source of reference potential. The loop amplifier may also include a conventional DC amplifier coupled to the output of the filter having a third resistor at the input and a feed back resistor coupled from a point between the third resistor and a gain element to the output terminal in turn coupled to the output lead of the gain element, which arrangements are well known in the art. Another circuit arrangement that may be utilized for the loop amplifier 66 is shown on page 1949 of an article by W. L. Nelson entitled, "Phase-Lock Loop Design for Coherent Angle-error Detection in the Telstar Satellite Tracking System," in The Bell Systems Technical Journal, September 1963, Number 5, volume XLII. The AGC amplifier and integrator 9 may be similar to the loop amplifier 66 except with an integrating capacitor provided at the output lead.

Figure 2:
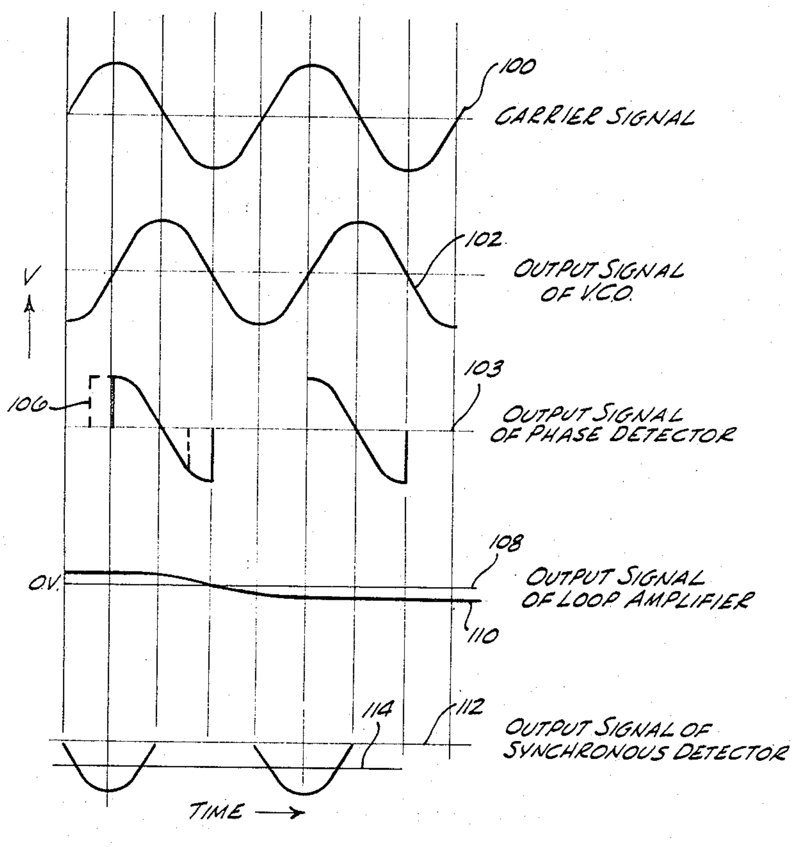
FIG. 2 is a schematic diagram of waveforms showing voltage as a function of time for explaining the operation of the demodulator system of FIG. 1.

Referring now to the waveforms of FIG. 2, the operation of the FM demodulator 58 will be generally explained. The carrier signal after gain control on the lead 62 is shown as a waveform 100 having a substantially constant frequency for the unmodulated condition and the signal developed by the VCO 68 on the lead 72 is shown as the waveform 102 leading the carrier signal 90 degrees in phase. As is well known in the art, the output signal of a linearized phase detector is proportional to the phase differences of the input signals. However, phase difference is the integral of frequency difference so that the transfer function of the phase detector to a frequency difference input is that of an integrator. The output signal developed by the VCO 68 is a frequency difference proportional to the control voltage input so that its transfer function is simply a gain constant $K_2$. The phase detector output shown by a waveform 103 for the condition of zero phase difference from the 90° phase condition provides a voltage that defines an equal area above and below the voltage reference level. The signal of the waveform 103 is developed during the positive half cycles of the waveform 102 so that a shift of the carrier signal in frequency to a higher frequency, for example, causes the signal of the waveform 103 to shift to a dotted waveform 106 so that more positive voltage is applied to the lead 64 than negative voltage. As a result, the loop amplifier 66, which in response to the absence of frequency modulation applies a signal of a waveform 108 to the lead 70 at a reference level, develops a modulation of a waveform 110 representative of the instantaneous frequency variation of the carrier signal of the waveform 100. The signal of the waveform 110 shifts the frequency of the VCO 68 so that the VCO signal of the waveform 102 tracks the carrier signal in frequency.

The synchronous detector 80 which may be a circuit similar to the phase detector 60, responds to the VCO output signal of the waveform 102 and the carrier signal after a 90 degrees phase shift, to provide amplitude demodulation. Thus, the synchronous detector 80 responds to the amplitude of the phase shifted carrier signal of the waveform 100 to develop signals of a waveform 112, which after being applied to the amplifier and integrator 90 provides a DC level of a waveform 114 for controlling the gain of the IF amplifier 56. It is to be understood that variations of the negative peak amplitudes of the signals of the waveforms 112 vary the DC level of the waveform 114 so that the carrier signal of the waveform 100 is applied to the lead 62 with a substantially constant peak amplitude.

Before further explaining the operation of the wideband demodulator of the invention, some general characteristics of FM demodulator loops will be discussed. When the phase loop is locked, the two input signals to the phase detector 60 are identical in average frequency but with a 90 degree difference in phase. Sinusoidal variations of the input carrier frequency cause symmetrical variations about the average 90 degrees of phase difference between the two input signals applied to the phase detector. The variations in phase due to modulation of the input frequency are small compared to 90 degrees so that the transfer function of the phase detector for small angular variations is represented by:

$$e_0=K_1\sin(\Delta\theta_1)\approx K_1(\Delta\theta_1)=K_1\int(\Delta\omega_1)\,dt \qquad (1)$$

where $e_0$ is the voltage at the output of the phase detector $K_1$=the gain constant of the phase detector 60 in volts/radian $\Delta\theta_1$ is the phase difference between the phase detector input signals relative to 90° average difference $\Delta\omega_1$=the frequency difference between the phase detector input signals.

The loop filter transfer function in the loop amplifier 66 is conventionally of the form:

$$F(S)=K_2\frac{1+S/\omega_2}{1+S/\omega_1} \qquad (2)$$

where

S is the complex frequency variable which for this discussion can be reduced to $(j\omega)$ $\omega_1$ and $\omega_2$ are respectively the lowest and highest critical frequencies of the loop network, $\omega_2$ being much greater than $\omega_1$ $K_2$ is the gain constant of the loop amplifier 66 in volts per volt.

The transfer function of Equation 2 is for a second order loop. As is well known in the art, the transfer function for a first order loop is equal to $K_2$. The difference in behavior between a first and second order loop is that the second order loop does not have a static phase error due to shifts in the average IF frequency or due to erroneous tuning of the VCO.

The linear VCO 68 which provides an output voltage proportional to the applied control voltage has a transfer function:

$$\frac{\Delta\omega_o}{e_o}(S)=2\pi K_3 \qquad (3)$$

where $e_c$=the control voltage input signal on the lead 70

$K_3$ is the gain of the VCO 68 in c.p.s. (cycles per second) per volt.

Figure 3:
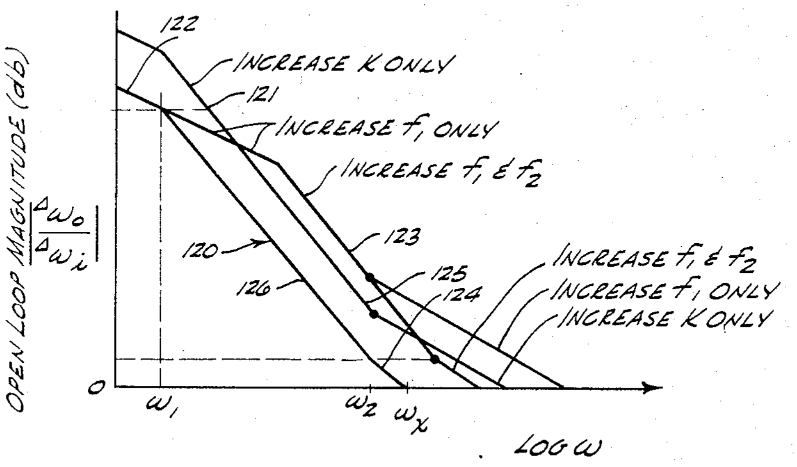
FIG. 3 is a graph of the open loop magnitude function of the demodulator loop as a function of radian modulation frequency for explaining the loop gain constants of the system of FIG. 1.

The open loop gain K of the demodulator 58 which is the product ($K_1$ $K_2$ $K_3$) cycles per second indicates the lock on range of the loop represented by a curve 120 of FIG. 3. The absolute value of $\Delta\omega_o/\Delta\omega_i$ is the ratio of radian deviation frequencies on respective leads 62 and 72. The slope of portions 122 and 124 of the curve 120 are provided by only the gain of the phase detector. The slope of the portion 126 of the curve 120 is provided by both the amplifier loop network 66 and the phase detector 60. The VCO 68 provides a constant gain to the system. The radian frequency $\omega_X$ is selected with a value at unity gain so that a stable servo loop is maintained, that is so the loop is provided with sufficient phase margin to prevent oscillation. In the system in accordance with the invention, the loop gain may be increased to provide a desired loop noise bandwidth and natural resonant frequency $\omega_n$ by selecting any desired combination of ($K_1$ $K_2$ $K_3$) as well as by selecting the critical frequencies of the loop $\omega_1$ and $\omega_2$ as will be explained subsequently.

The closed loop response H (S) of a phase locked FM demodulator, neglecting loop time delay, is:

$$H(S)=\frac{\Delta\omega_o}{\Delta\omega_i}(S)=\frac{G(S)}{1+G(S)}=\frac{1+S/\omega_2}{1+S(1/\omega_2+1/K)+S^2(K\omega_1)}=\frac{1+2\xi(S/\omega_n)}{1+2\xi(S/\omega_n)+(S/\omega_n)^2} \qquad (4)$$

where $\xi$=relative damping or $$\left(\frac{\omega_n}{2\omega_2}\right)$$

Thus the following identifications are true when $K>>\omega_n$:

$$\omega_2=\frac{\omega_n}{2\xi}=\frac{\omega_n}{\sqrt{2}},\ \text{for}\ \xi=\frac{1}{\sqrt{2}} \qquad (5)$$

$$\omega_1=\frac{\omega_n^2}{K} \qquad (6)$$

For a conventional demodulator loop, the critical frequencies $\omega_1$ and $\omega_2$ are thus optimized to minimize the total mean square phase error caused by both IF noise and modulation.

The closed loop noise bandwidth (one-sided) $B_o$ may be conventionally expressed as:

$$B_o=\int_0^\infty (Hj\omega)^2 df=1/4\left[\frac{2\pi K\omega_1}{\omega_2}+\omega_2\right]=\frac{\omega_n}{8\xi}(1+4\xi^2)\ \text{c.p.s.} \qquad (7)$$

where $j$ is an imaginary number equal to the square root of −1.

Figure 4:
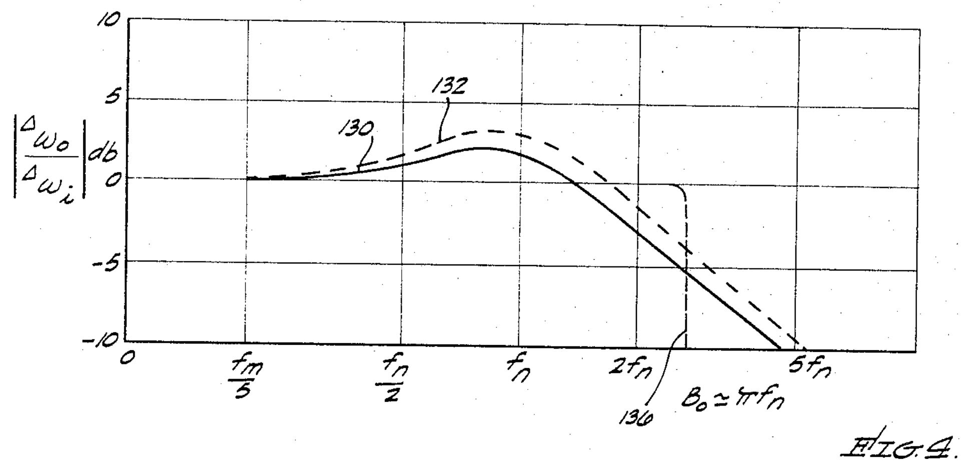
FIG. 4 is a graph of the ratio of output signal to input signal radian frequency deviations normalized by the undamped resonant frequency for explaining the closed loop response of the demodulator system of FIG. 1.

Referring to FIG. 4, $\Delta\omega_o/\Delta\omega_i$ is shown as a function of modulating frequency normalized by $\omega_n$, the closed loop natural undamped resonant frequency of the loop. The closed loop response is shown by a curve 130 and the closed loop response with the effect of loop time delay is shown by a curve 132. A curve 136 shows the noise bandwidth of a conventional FM demodulator in which the noise bandwidth is approximately equal to $\pi f_n$ (where $f_n=\omega_n/2\pi$). The natural resonant frequency $f_n$ or $\omega_n$ is conventionally relatively small to prevent threshold degradation.

To consider the threshold carrier to noise power of a conventional second order phase lock loop, the phase error due to modulation $\phi_m$ may be expressed as:

$$\phi_m^2=1/2\left[\frac{\Delta\omega_i\omega_b}{\omega_n^2}\right]^2=\frac{M^2}{2}\left(\frac{\omega_b}{\omega_n}\right)^4\ \text{rad}^2 \qquad (8)$$

where $\Delta\omega_i$=radian input frequency $\omega_b$=maximum modulating or baseband frequency $\omega_n$=closed loop natural, undamped resonant frequency in radians per second or $B_o/3.33$ for a conventional demodulator with $\xi=1/\sqrt{2}$, $\xi$ being the relative damping of the phase lock loop $M=\omega_1/\omega_b$ or modulating index in radians.

The means square phase error due to input noise $\phi_n$ is:

$$\phi_n^2=\frac{n}{C}B_o=\frac{3_n\omega_n}{C4\sqrt{2}}\ \text{rad}^2 \qquad (9)$$

where $n$=noise power density in watts per c.p.s.

$C$=carrier power in watts.

It is found experimentally that for conventional feedback demodulators threshold occurs when $\phi_T^2$=⅛ rad². Total means square phase error $\phi_T^2$ of ⅛ radian² has been determined experimentally to be associated with the onset of threshold. The components of $\phi_T^2$ are:

$$\phi_m^2+\phi_n^2=\frac{M^2}{2}\left(\frac{\omega_b}{\omega_n}\right)^4+\frac{3}{4\sqrt{2}}\frac{n\omega_n}{C} \qquad (10)$$

where $\phi_T$=the total RMS phase error.

As is well known in the art, the threshold occurs when the relation between outputs signal-to-noise and carrier-to-noise becomes nonlinear which may be at a carrier to noise ratio of 7 db measured in an IF bandwidth $2B_o$.

The value of $\phi_T^2$ is minimized in a conventional phase lock demodulator by proper selection of $\omega_n$:

$$\omega_n]\ \text{opt}=\left[\frac{\sqrt{2}\ 8CM^2\ \omega_b^4}{3_n}\right]^{1/5} \qquad (11)$$

$$C_T=5/6\,\frac{M^{1/2}\omega_b}{\phi_T^{5/2}}\ \text{watts}=11.25M^{1/2}\omega_b \qquad (11a)$$

for $$\phi_T=\frac{1}{\sqrt{8}}\ \text{rad}$$

Substituting equation (11a) into equation (10) provides:

$$\frac{C_T}{2nf_b}=\frac{2.62}{\phi_T^{5/6}}M^{1/2}=6.2M^{1/2},\ \text{for}\ \phi_T=\frac{1}{\sqrt{8}} \quad (12)$$

where $C_T$=threshold carrier power in watts,
$n$=IF noise density in watts/c.p.s.

Figure 5:
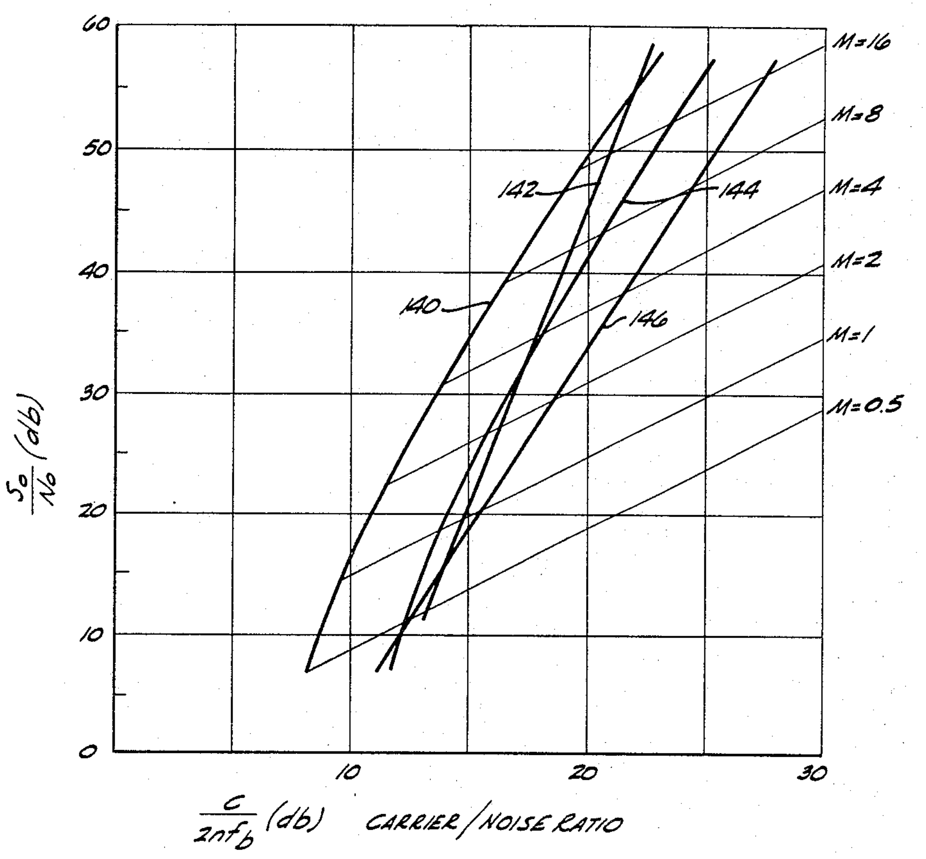
FIG. 5 is a graph of the threshold output signal to output noise ratio as a function of the carrier to noise ratio measured in twice the base bandwidth and as a function of modulation index for explaining the increased threshold sensitivity of the FM demodulator system of FIG. 1.

A curve 142 is plotted in FIG. 5 from Equation 12 to show the carrier-to-noise ratio of a conventional optimum second order phase lock demodulator with wideband input noise. Substituting the optimum value of $\omega_n$ from Equation 11 for the phase locked loop into the Equation 10 for $\phi_T^2$:

$$\phi_m^2+\phi_n^2=n/C\omega_{n_{opt}}\frac{3}{4\sqrt{2}}[1/4+1]\ \text{rad}^2 \quad (13)$$

It can be determined from the above equation that $\phi_n^2=4\phi_m^2$ for an optimum loop. At threshold:

$$\phi_T^2=\phi_n^2+\phi_m^2=5\phi_m^2=1/8\ \text{rad}^2 \quad (14)$$

Therefore:

$$\phi_m^2=\phi_T^2/5=1/40\ \text{rad}^2 \quad (15)$$

Substituting this $\phi_m^2$ into Equation 8 and solving for $\omega_n$ the result is:

$$\omega_n]_{opt}=13.3\ M^{1/2}f_b\ \text{rad} \quad (16)$$

where $$f_b=\omega_b/2\pi$$

$\omega_n]_{opt}$ minimizes mean square phase error due to both noise and modulation at threshold.

The two sided noise bandwidth of the conventional loop is from Equation 7, for $\xi=1/\sqrt{2}$, $$2B_o=2\frac{3}{4\sqrt{2}}\omega_n=14\ M^{1/2}f_b \quad (17)$$

When the closed loop is preceded by an IF filter, of minimum allowable bandwidth, it has been found that the IF noise bandwidth need be no greater than:

$$B_{IF}=2f_b\ (M+1)\ \text{c.p.s.} \quad (18)$$

In the system of the invention, the IF noise bandwidth is less than the two sided closed loop noise bandwidth. Thus, the mean square phase error at threshold, due to noise ($\phi_n^2=4/5\ \phi_T^2=1/10$ for the conventional optimized loop) is substantially less than without IF filtering. A range of modulation index M will now be determined over which $B_{IF}<2B_o$:

$$\frac{2B_o}{B_{IF}}=\frac{8.38f_b\left(\frac{M}{\phi_T}\right)^{1/2}}{2f_b(M+1)}=\frac{7M^{1/2}}{M+1} \quad (19)$$

By substituting $2B_o/B_{IF}=1$ and solving for M, it is found that:

$$B_{IF}<2B_o\ \text{when}\ M<33 \quad (20)$$

A threshold equation will now be derived which includes the IF noise bandwidth as a parameter. At threshold, the total means square phase error is:

$$\phi_T^2=\phi_n^2+\phi_m^2=\frac{n\omega_n}{2\pi C}\int_0^A\left|H\left(j\frac{\omega}{\omega_n}\right)\right|^2 d\frac{\omega}{\omega_n}+\frac{M^2}{2}\left(\frac{\omega_b}{\omega_n}\right)^4 \quad (21)$$

$$\phi_T^2=\frac{n\omega_n}{8\pi\sqrt{2}C}\left[6\tan^{-1}\frac{\sqrt{2}A}{1-A^2}-\ln\frac{A^2+\sqrt{2}A+1}{A^2-\sqrt{2}A+1}\right]+\frac{M^2}{2}\left(\frac{\omega_b}{\omega_n}\right)^4=\frac{1}{8} \quad (22)$$

where ln is the natural logarithm where $$A=\frac{2\pi B_{IF}}{2\omega_n}$$

It may be assumed that the same mean square phase error apportionment may be utilized that optimizes the loop when $B_{IF}\to\infty$ so that from Equations 14 and 15:

$$\phi_m^2=\phi_T^2\frac{1}{5}=\frac{1}{40}\ \text{rad}^2 \quad (23)$$

$$\phi_n^2=\frac{4}{5}\phi_T^2=\frac{1}{10}\ \text{rad}^2 \quad (24)$$

Thus, only the first term of Equation 22 is considered:

$$\phi_n^2=\frac{4}{5}\phi_T^2=\frac{n\omega_n}{8\pi\sqrt{2}C}\left[6\tan^{-1}\frac{\sqrt{2}A}{1-A^2}-\ln\frac{A^2+\sqrt{2}A+1}{A^2-\sqrt{2}A+1}\right] \quad (25)$$

Substituting for $\omega_n$ the optimum value of $\omega_n$ from Equation 16 and solving for $C_T/2nf_b$ the following is obtained:

$$\frac{C_T}{2nf_b}=1.86M^{1/2}\left[6\tan^{-1}\frac{\sqrt{2}A}{1-A^2}-\ln\frac{A^2+\sqrt{2}A+1}{A^2-\sqrt{2}A+1}\right] \quad (26)$$

where $$A=\frac{B_{IF}}{2f_n}=\frac{f_b(M+1)}{1.26f_b(M/\phi_T)^{1/2}}\approx\frac{(M+1)}{2.1M^{1/2}}$$

Curve 140 of FIG. 5 is plotted from Equation 26.

Referring now to FIG. 5, the curve 140 shows the output signal-to-noise ratio as a function of the carrier-to-noise ratio and index of modulation for the phase lock demodulator of the invention with the input noise limited by an IF filter and the frequency $f_n$ greater than $B_{IF}/2$, which in the system of the invention is the effective one sided noise bandwidth $B_o'$. The curve 142 shows the characteristics of an optimized second order conventional phase lock demodulator with a wide pass band at the input lead so that $B_{IF}$ is much greater than $2B_o$. A curve 144 shows the characteristics of a conventional limiter discriminator and a curve 146 shows the characteristics of an optimized conventional first-order phase lock demodulator with wideband input noise, that is, $B_{IF}$ is much greater than $2B_o$. Thus it can be seen by curve 140 that when the received carrier power is sufficient to operate a conventional discriminator or demodulator safely above threshold, the substitution of a phase locked demodulator in accordance with the principles of the invention offers no significant improvement in $S_o/N_o$. However, when the carrier power is subject to large variations which may fall below discriminator threshold requirements, the phase lock demodulator of the invention provides up to 4 db of improvement, for example. A conventional demodulator or discriminator operating on a carrier power that is 4 db below threshold has an output signal-to-noise ratio which is reduced 8 to 12 db. The phase locked demodulator system of the invention having a relatively large threshold sensitivity while operating in the linear region and receiving the same reduced carrier signal has an output signal-to-noise ratio which is reduced only 4 db. The curve 140 shows that the benefit of minimum IF bandwidth is relatively large at low values of modulation index M.

Also, in a system where the RF bandwidth is a free variable, the phase lock demodulator system in accordance with the invention may provide a higher output signal-to-noise ratio than does a conventional demodulator or discriminator. As may be seen in FIG. 6, curves 147, 149 and 151 show the occurrence of the threshold power respectively for a conventional limiter discriminator, a conventional phase lock demodulator and the improved phase locked demodulator in accordance with the invention. The knee of the curve 151 shows the threshold improvement (output test tone-to-noise ratio) over a conventional phase lock demodulator for an example of the system of the invention is approximately 5.5 db. For the same carrier power with the modulation index increased from 6 radians to 22.5 radians in the system of the invention, a curve 161 shows that the output test tone-to-noise ratio is increased approximately 11.5 db.

To minimize intermodulation noise in the demodulation of FM signals, linearity of the loop elements is a fundamental requirement. The practical phase detector can be a source of nonlinearity if phase error due to modulation is not constrained to relatively narrow limits. The peak output signal $\hat{e}_o$ of the phase detector with a noise free input signal is:

$$\hat{e}_o=K_1 \sin \hat{\phi}_m \simeq K_1\hat{\phi}_m\left[1-\frac{\hat{\phi}m^2}{6}\right] \quad (27)$$

where $\hat{\phi}_m$ is the peak phase error due to sinusoidal modulation.

The transfer function for the phase detector can therefore be written as:

$$\frac{\hat{e}_o}{\hat{\phi}_m}=K_1\left[1-\frac{\hat{\phi}_m^2}{6}\right] \quad (27a)$$

The phase error $\hat{\phi}_m$ due to modulation derived from a consideration of Equation 8 is equal to $$M\left(\frac{f_b}{f_n}\right)^2$$

and substituting into Equation 27*a* for $\hat{\phi}_m$ provides:

$$\frac{\hat{e}_o}{\hat{\phi}_m}=K_1\left[1-\frac{M^2}{6}\left(\frac{f_b}{f_n}\right)^4\right] \quad (28)$$

It is to be observed that the undesired second term of Equation 28 varies inversely as the fourth power of $f_n$ whereas the loop noise bandwidth is proportional to $f_n$ as shown by Equation 17. It would therefore be conventionally impractical to increase $f_n$. However, as shown by Equation 26, $f_n$ can be increased by a relatively large multiple without increasing the effective noise bandwidth and consequently degrading demodulation threshold. One important advantage of increasing $f_n$ is that phase error due to modulation is reduced and consequently intermodulation noise caused by third order phase detector nonlinearity is greatly reduced.

Referring now to FIG. 7 as well as to FIG. 4, the one sided noise bandwidth $B_o$ is shown in FIG. 4 at 136 without an IF filter with the $B_{IF/2}$ and the noise bandwidth $B_o$ much greater than $f_n$ and substantially equal to $\pi f_n$. Thus, in the conventional demodulator as indicated in FIG. 4, the noise bandwidth $B_o$ is substantially the same as $B_{IF/2}$. The noise bandwidth 150 in FIG. 7 shows the band limit of effective noise $B_o'$ resulting from the IF narrow band filter in accordance with the invention. The area included in the noise bandwidth 150 represents the low pass equivalent response of the IF bandpass filter. The effective noise bandwidth $B_o'$ is substantially equal to $B_{IF/2}$. Because the noise power or effective noise bandwidth $B_o'$ is limited and determined by the IF bandwidth, the phase locked loop is selected so that $f_n$ is substantially larger than $B_{IF/2}$ or about 3 times the optimum value for the conventional loop (Equation 16). A curve 151 shows the response $|H(j\omega)|$ of the demodulator of the invention with the resonant frequency $f_n$ selected to be relatively large. Because the noise is limited by the IF filter, $f_n$ is not limited or restricted by the noise bandwidth considerations. The noise bandwidth $B_o$ may be equal to $3.33f_n$. The large loop bandwidth resulting from the large $f_n$ provides the reduction of mean square phase error due to modulation $\phi_m^2$ as indicated by Equation 10 where it is apparent the $\phi_m^2$ due to modulation varies inversely as the fourth power of $f_n$. Because $\phi_m$ is one component of total phase error that normally degrades threshold sensitivity as shown by Equation 26, its reduction increases threshold sensitivity.

The 3 db loop bandwidth is shown at a point 153 where the gain decreases by 3 db. Although the system has been described as a function of the resonant frequency for ease of understanding, the loop bandwidth which is a function of $f_n$ is also increased in accordance with the principles of the invention. The loop noise bandwidth $2B_o$ may be related to $f_n$ by the following expression:

$$2B_o=\frac{\pi f_n}{2\xi}[1+4\xi^2] \quad (29)$$

Thus the noise bandwidth $2B_o$ of a conventional demodulator is determined by the value of $f_n$ (and $\xi$) while the effective two sided noise bandwidth $2B_o'$ of the present invention is determined by the IF bandwidth and is equal to $B_{IF}$. The threshold improvement of the system of the invention over a conventional demodulator is proportional to the ratio of the noise bandwidth and as discussed relative to FIG. 6 may be 4–5 decibels.

The demodulator system in accordance with the principles of the invention thus limits the noise power by the IF filters so that the loop may have a relatively large gain factor K. As a result, the resonant frequency $f_n$ is increased. The system in accordance with the invention may either be utilized to increase the threshold sensitivity or to increase the output signal to noise ratio over that provided by the conventional arrangement. The system maintains a linear relation between output test tone-to-noise and input carrier-to-noise for carrier power that, for example, is from 4 db to 7 db less than that required for conventional demodulator systems. When the received power is predetermined but the modulation index is variable, the system of the invention provides, for example, 12 db increase in output test tone-to-noise ratio. The system may operate at a relatively high modulation index. The demodulator of the invention has a high degree of flexibility in that a loop designed for one IF bandwidth, demodulates signals at a narrower bandwidth without affecting the loop operation because the $f_n$ is relatively large. The frequency $f_n$ is selected sufficiently large so that phase error due to modulation is insignificant during operation with the maximum IF bandwidth. Subsequent reduction of bandwidth results in a decrease of modulation error and provides substantially no effect on system operation. Therefore, the filters 46 or 48 of FIG. 1 may be selected by the switch 50 and a variation of parameters in the demodulator 58 is not required.

To provide a desired value of $f_n$ (or $\omega_n$) in accordance with the priniciples of the invention, not only the gain constant K but $f_1$ and $f_2$ (or $\omega_1$ and $\omega_2$) may be varied in accordance with Equations 5 and 6 to provide a desired $f_n$. For example, $f_n$ may be increased from a relatively low value to a relatively large value without increasing the gain constant K. However, some increase of gain K is desirable because a larger reduction of phase error due to modulation is provided than by increasing $f_n$ without increasing K. If a relatively large value of $f_n$ is selected and provided principally by utilizing a large value of K as shown by a curve 121 of FIG. 3 without increasing $f_1$ and $f_2$ from values utilized with a conventional $f_n$, the loop damping is increased. The natural resonant frequency $f_n$ may be increased by a factor of 3 from a conventional value, for example, by increasing $f_2$ by a factor of 3 and increasing K by a factor of 9; by increasing $f_2$ by a factor of 3 and increasing $f_1$ by a factor of 9 as shown by a curve 123 of FIG. 3; or by increasing either K alone or $f_1$ alone as shown by a curve 125, with a resultant increase in damping ratio $\xi$. As may be seen by Equation 4 an increase of K increases the closed loop response of the system.

To further illustrate the threshold improvement provided by the demodulator system of the invention an example will be given comparing a conventional phase lock demodulator and the phase lock demodulator of the invention. It is assumed that the FM signal parameters are the peak deviation $(\Delta f_1)=75$ kc. and the maximum modulating frequency $(f_b)=15$ kc. The modulating index M is therefore equal to $\Delta f_1/f_b=5$.

The two sided noise bandwidth $2B_o$ for the conventional phase lock demodulator is from Equation 17:

$$2B_o = 14M^{1/2}f_b = 470 \text{ kc.}$$

The phase error due to modulation ($\phi_m$) is equal to $$\frac{1}{2\sqrt{10}}$$

radians MS.

For the phase lock demodulator of the invention, $f_n$ is increased by a factor of 3:1 by increasing the loop gain K by a factor of 9:1 and $f_2$ by a factor of 3:1, for example. The two sided noise bandwidth is:

$$2B_o = 42M^{1/2}f_b = 1.41 \text{ mc.}$$

which is the noise bandwidth of the loop not considering the IF filter. The phase error due to modulation ($\phi_m$) is equal to $$\frac{1}{18\sqrt{10}}$$

radians MS. The effective two sided noise bandwidth $2B_o'$ which is equal to the IF bandwidth is equal to $2f_b(M+) = 180$ kc.

The threshold improvement of the demolulator of the invention over the conventional phase lock demodulator is the ratio of effective noise bandwidths. The threshold improvement is equal to:

$$10 \log \frac{470KC}{180KC} = 4.15\ db$$

Thus, the demodulator system in accordance with the invention operates above threshold with a received carrier power much less than is required by a conventional discriminator or demodulator. The system which utilizes a narrow band filter external to the loop and a relatively large gain parameter in the phase lock loop, is more sensitive than arrangements conventionally known to the art. At a fixed carrier to noise level, a relatively large increase of demodulator signal to noise ratio may be provided.

What is claimed is:

1. A demodulator responsive to a source of signals comprising
   filter means coupled to the source of signals for providing a passband with a selected bandwith value,
   and a phase lock loop coupled to said filter means and including means for providing an undamped resonant frequency larger than half of said selected bandwidth value.

2. A demodulator system responsive to a source of signals having noise power associated therewith comprising
   filter means coupled to the source of signals for providing a passband with a bandwidth value selected to substantially limit the noise power associated with said signals,
   and a phase lock loop coupled to said filter means and including means for developing a passband with a bandwidth value substantially greater than one-half of the bandwidth value of said filter means and with a natural resonant frequency greater than one-half of the bandwidth value of said filter means to provide a loop gain constant for developing a phase error due to input signal modulation that is relatively small compared to the phase error due to noise passed through said filter means.

3. A demodulator responsive to a source of signals comprising
   filter means coupled to the source of signals and having a selected intermediate frequency passband bandwidth value,
   and a phase lock loop responsive to the signals passed through said filter means and including a phase detector coupled to said filter means, a loop amplifier coupled to said phase detector and voltage controlled oscillator coupled between said loop amplifier and said phase detector, said phase detector, said loop amplifier and said voltage controlled oscillator including means for providing an undamped resonant frequency larger than the value of one-half of said passband bandwidth value.

4. A demodulator responsive to a source of signals comprising
   filter means coupled to the source of signals for providing a selected passband,
   and a phase lock loop responsive to the signals passed through said filter means and including a phase detector coupled to said filter means, a loop amplifier coupled to said phase detector and a voltage controlled oscillator coupled between said loop amplifier and said phase detector, said phase detector, loop amplifier and voltage controlled oscillator providing gain constants so that said phase lock loop has a natural resonant frequency greater than the low pass equivalent of said selected passband.

5. A demodulator responsive to a source of signals having a wide bandwidth of noise power associated therewith comprising
   a narrow band filter coupled to the source of signals to develop a passband bandwidth of a selected value to limit the noise power,
   and a phase lock demodulator loop coupled to said narrow band filter and including means for developing an overall gain characteristic so that the natural undamped resonant frequency of said loop is substantially larger than half of said bandwidth value of said narrow band filter.

6. A demodulator responsive to a source of signals having noise associated therewith comprising
   a filter coupled to the source of signals and providing a selected passband bandwidth for limiting noise,
   a phase detector coupled to said filter,
   a loop amplifier coupled to said phase detector,
   and a voltage controlled oscillator coupled between said loop amplifier and said phase detector, said phase detector, said loop amplifier and said voltage controlled oscillator forming a closed loop having an equivalent low pass bandwidth of said filter and having gain and frequency characteristics selected to develop an undamped resonant frequency substantially larger than said equivalent low pass bandwidth.

7. A demodulator system responsive to a source of signals having noise power associated therewith comprising
   a plurality of narrow band filters coupled to the source of signals, said filters having passband bandwidths of different values,
   selection means coupled to said plurality of filters for controlling said filters to apply said signals through a selected filter to a terminal,
   a phase detector coupled to said terminal,
   a loop amplifier coupled to said phase detector,
   and a voltage controlled oscillator coupled between said loop amplifier and said phase detector, said phase detector, said loop amplifier and said voltage controlled oscillator including means to develop a gain characteristic so that the undamped resonant frequency is substantially larger than the bandwidth values of the passbands of each of said narrow band filters.

References Cited

UNITED STATES PATENTS

| | | | |
|---|---|---|---|
| 3,111,625 | 11/1963 | Crafts | 329—122 X |
| 3,154,741 | 10/1964 | Attwood | 328—155 X |
| 3,183,451 | 5/1965 | Zolnik | 328—155 X |

NATHAN KAUFMAN, *Acting Primary Examiner.*

ALFRED L. BRODY, ROY LAKE, *Examiners.*